US009148356B2

(12) United States Patent
Amano et al.

(10) Patent No.: US 9,148,356 B2
(45) Date of Patent: Sep. 29, 2015

(54) COMMUNICATION APPARATUS, METHOD FOR IMPLEMENTING COMMUNICATION, AND NON-TRANSITORY COMPUTER-READABLE MEDIUM

(75) Inventors: Katsuhiro Amano, Toyota (JP); Go Hasegawa, Osaka (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 387 days.

(21) Appl. No.: 13/615,743

(22) Filed: Sep. 14, 2012

(65) Prior Publication Data
US 2013/0003594 A1 Jan. 3, 2013

Related U.S. Application Data

(63) Continuation-in-part of application No. PCT/JP2011/056920, filed on Mar. 23, 2011.

(30) Foreign Application Priority Data

Mar. 31, 2010 (JP) .................................. 2010-079980

(51) Int. Cl.
H04L 12/26 (2006.01)
(52) U.S. Cl.
CPC ............ *H04L 43/0882* (2013.01); *H04L 43/10* (2013.01)
(58) Field of Classification Search
None
See application file for complete search history.

(56) References Cited

U.S. PATENT DOCUMENTS

| 6,967,921 | B1* | 11/2005 | Levy et al. ................. 370/230.1 |
| 7,460,480 | B2* | 12/2008 | Awais ........................... 370/236 |
| 8,488,447 | B2* | 7/2013 | Bugenhagen et al. ......... 370/228 |
| 2004/0136379 | A1* | 7/2004 | Liao et al. ................ 370/395.21 |
| 2005/0286416 | A1* | 12/2005 | Shimonishi et al. .......... 370/229 |
| 2007/0094381 | A1* | 4/2007 | Weiss et al. .................. 709/224 |
| 2008/0049625 | A1* | 2/2008 | Edwards et al. .............. 370/241 |
| 2008/0049638 | A1* | 2/2008 | Ray et al. ...................... 370/252 |

(Continued)

FOREIGN PATENT DOCUMENTS

JP 2010-062720 A 3/2010

OTHER PUBLICATIONS

Tsugawa et al., "Implementation and evaluation of an inline network measurement algorithm and its application technique", Technical Report of the Institute of Electronics, Information and Communication Engineers, Dec. 8, 2005, vol. 105, No. 472, pp. 61-66.

*Primary Examiner* — Chirag Shah
*Assistant Examiner* — Suk Jin Kang
(74) *Attorney, Agent, or Firm* — Banner & Witcoff, Ltd.

(57) ABSTRACT

A communication apparatus includes a processor and a memory. The memory is configured to store computer-readable instructions that, when executed, instruct the communication apparatus to execute steps comprising acquiring a type of transmission data referring to information about the transmission data, and limiting a search range of a network bandwidth, in response to the acquired type of the transmission data, wherein the network bandwidth is measured by a transmission interval of a transmission of a plurality of packets via a network, and a reception interval of a reception of the plurality of packets via a network. The memory is configured to store computer-readable instructions that further instruct the communication apparatus to execute steps comprising setting the search range according to the limited search range, and transmitting a packet within the limited search range for measuring the network bandwidth.

15 Claims, 12 Drawing Sheets

(56) References Cited

U.S. PATENT DOCUMENTS

| | | | |
|---|---|---|---|
| 2008/0049775 A1* | 2/2008 | Morrill et al. | 370/419 |
| 2009/0164657 A1* | 6/2009 | Li et al. | 709/233 |
| 2010/0110907 A1* | 5/2010 | Kotrla et al. | 370/252 |
| 2012/0269089 A1* | 10/2012 | Morrill | 370/252 |
| 2013/0215774 A1* | 8/2013 | Bender et al. | 370/252 |
| 2014/0050106 A1* | 2/2014 | McNaughton et al. | 370/252 |

* cited by examiner

Fig.2A

Transmission data table

| | Type of codec | Sampling rate | A size of one frame (byte) | Lower bandwidth limit (kbps) | Upper bandwidth limit (kbps) | Average bandwidth (kbps) | Dispersion ($\sigma$) |
|---|---|---|---|---|---|---|---|
| Voice data | G.711 | 8kHz | - | 64(CBR) | | 64 | 0.00 |
| | G.723.1 | 8kHz | 20 | 5.3(CBR) | | 5.3 | 0.00 |
| | G.729 | 8kHz | 24 | 6.3(CBR) | | 6.3 | 0.00 |
| | | 8kHz | - | 8(CBR) | | 8 | 0.00 |
| | | 8kHz | - | 0.25 | 24.6 | 12.425 | 0.01 |
| | Speex | 16kHz | - | 4 | 42.4 | 23.2 | 0.01 |

Fig.2B

Transmission data table

| | Type of codec | Frame rate (fps) | Resolution | CPU (GHz) | Lower bandwidth limit (kbps) | Upper bandwidth limit (kbps) | Average bandwidth (kbps) | Dispersion ($\sigma$) |
|---|---|---|---|---|---|---|---|---|
| Moving picture data | H.261 | 30 | QCIF | Less than 3 GHz | 1.92 | 192 | 96.96 | 31.68 |
| | H.261 | 15 | QCIF | Less than 2 GHz | 1.92 | 128 | 64.96 | 21.01 |
| | H.261 | 5 | QCIF | Less than 1 GHz | 1.92 | 64 | 32.96 | 10.35 |
| | H.261 | 30 | CIF | Less than 3 GHz | 1.92 | 192 | 96.96 | 31.68 |
| | H.261 | 15 | CIF | Less than 2 GHz | 1.92 | 128 | 64.96 | 21.01 |
| | H.261 | 5 | CIF | Less than 1 GHz | 1.92 | 64 | 32.96 | 10.35 |
| | H.264 | 30 | VGA | Equal to or more than 3GHz | 1152 | 2304 | 1728 | 192.00 |
| | H.264 | 15 | VGA | Equal to or more than 2GHz | 768 | 1536 | 1152 | 128.00 |
| | H.264 | 5 | VGA | Equal to or more than 1GHz | 384 | 768 | 576 | 64.00 |

Fig.2C

Transmission data table

| Type of codec | Frame rate (fps) | Resolution | CPU (GHz) | Lower bandwidth limit (kbps) | Upper bandwidth limit (kbps) | Average bandwidth (kbps) | Dispersion ($\sigma$) |
|---|---|---|---|---|---|---|---|
| H.264 | 10 | WXGA | Equal to or more than 3GHz | 1000 | 2000 | 1500 | 166.67 |
| H.264 | 5 | WXGA | Equal to or more than 2GHz | 500 | 1000 | 750 | 83.33 |
| H.264 | 1 | WXGA | Equal to or more than 1GHz | 100 | 200 | 150 | 16.67 |
| JPEG | 10 | XGA | Less than 3GHz | 900 | 1800 | 1350 | 150.00 |
| JPEG | 5 | XGA | Less than 2Ghz | 450 | 900 | 675 | 75.00 |
| JPEG | 1 | XGA | Less than 1GHz | 90 | 180 | 135 | 15.00 |
| Text data | | | | | | | |

Fig.2D

| Transmission data table | | | | |
|---|---|---|---|---|
| | Frame rate (fps) | Lower bandwidth limit (kbps) | Upper bandwidth limit (kbps) | Average bandwidth (kbps) | Dispersion ($\sigma$) |
| | 60 | 0.3 | 0.6 | 0.45 | 0.05 |
| | 30 | 0.15 | 0.3 | 0.225 | 0.03 |
| | 10 | 0.05 | 0.1 | 0.075 | 0.01 |
| | | Lower bandwidth limit (kbps) | Upper bandwidth limit (kbps) | Average bandwidth (kbps) | Dispersion ($\sigma$) |
| Pointer position data | | 0.5 | 10 | 5.25 | 1.58 |
| Control information | | | | | |

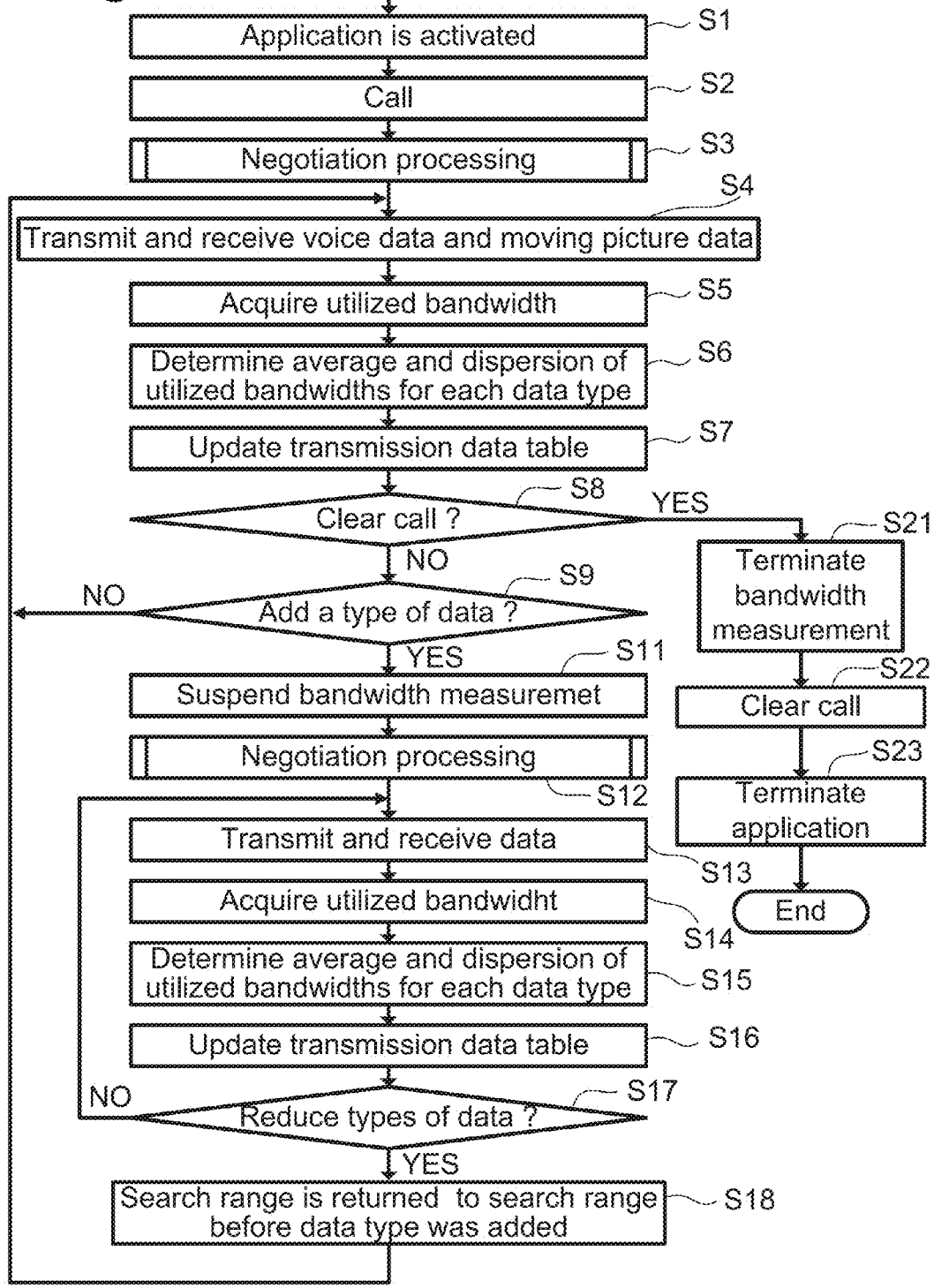

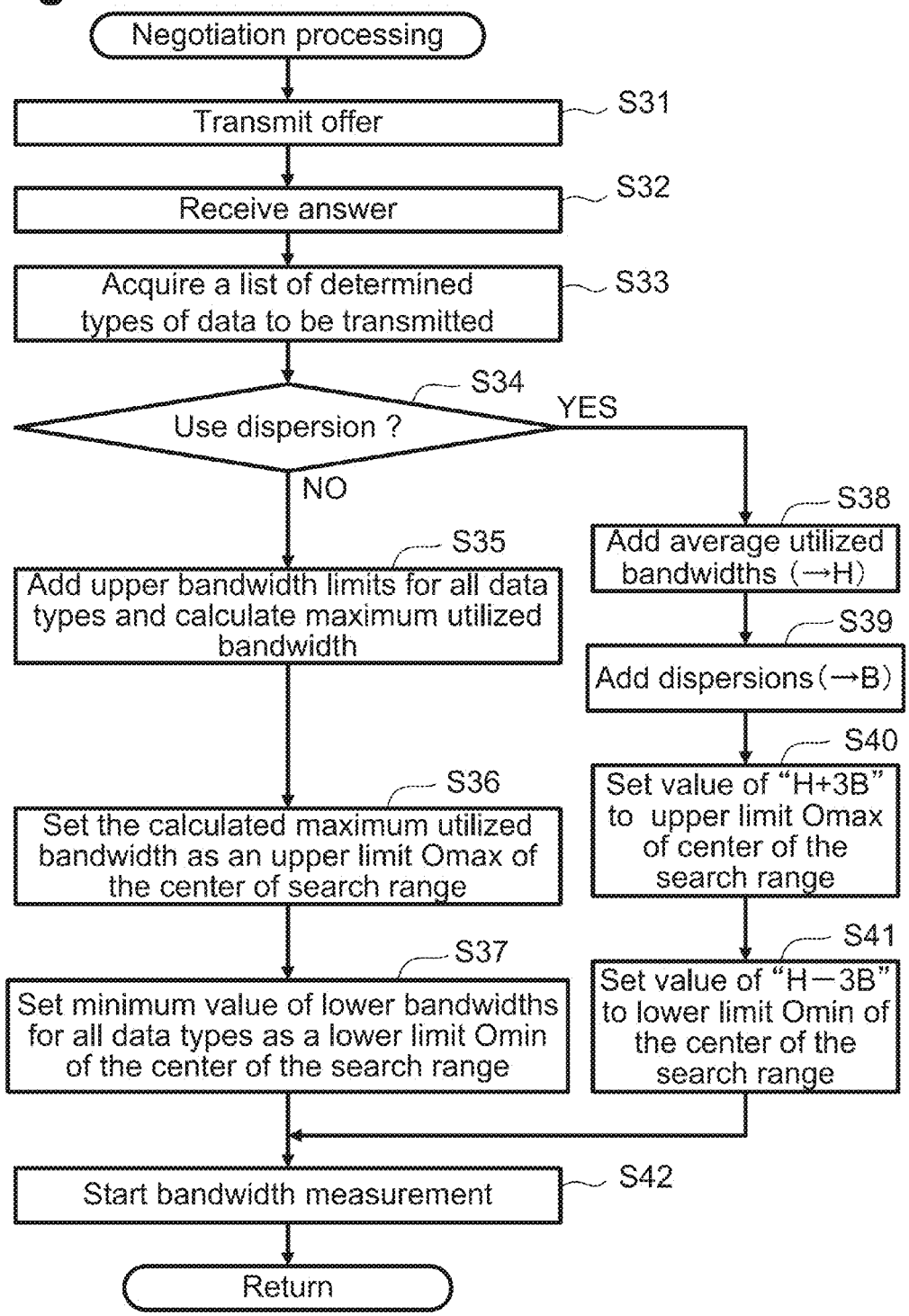

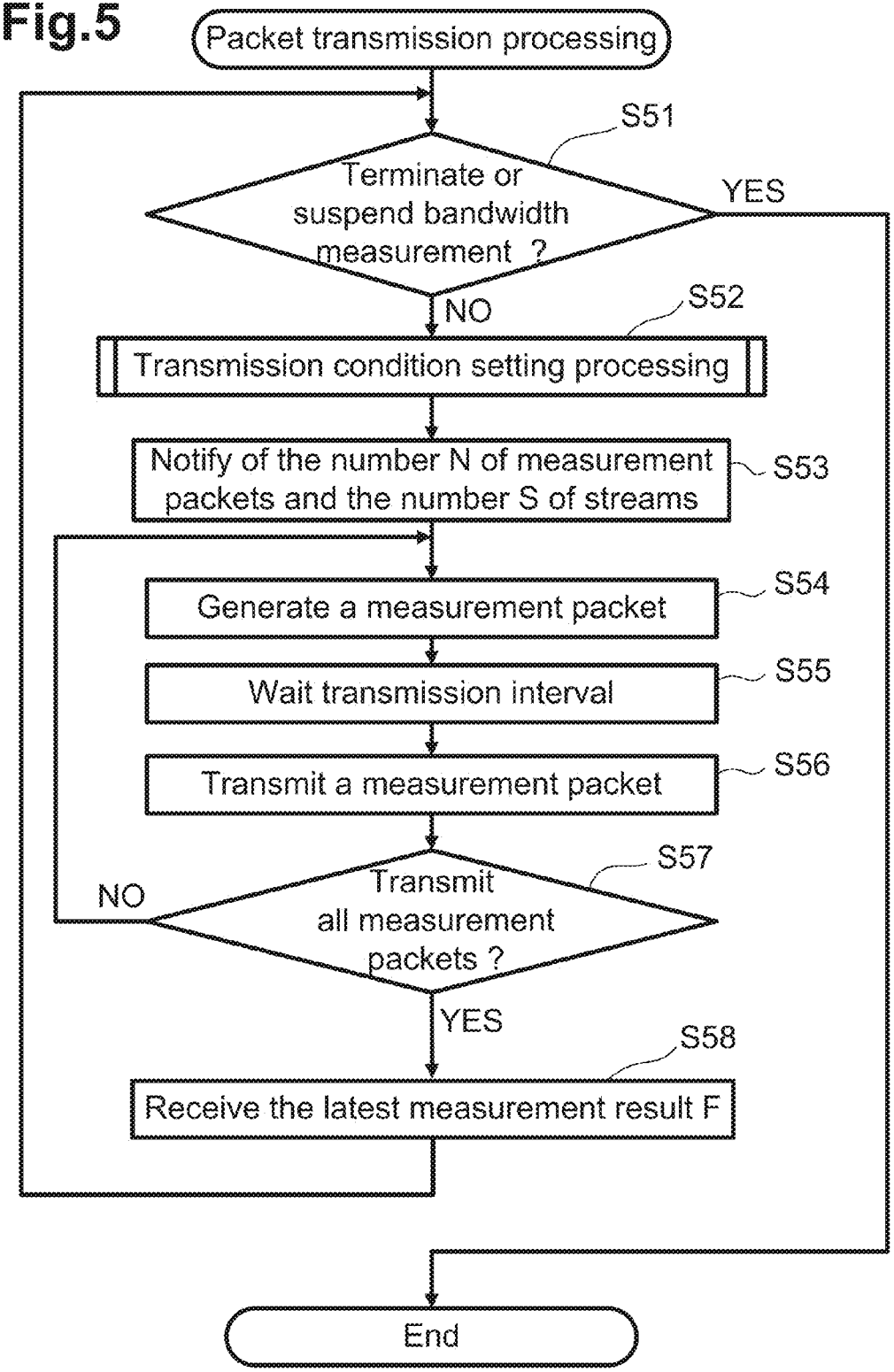

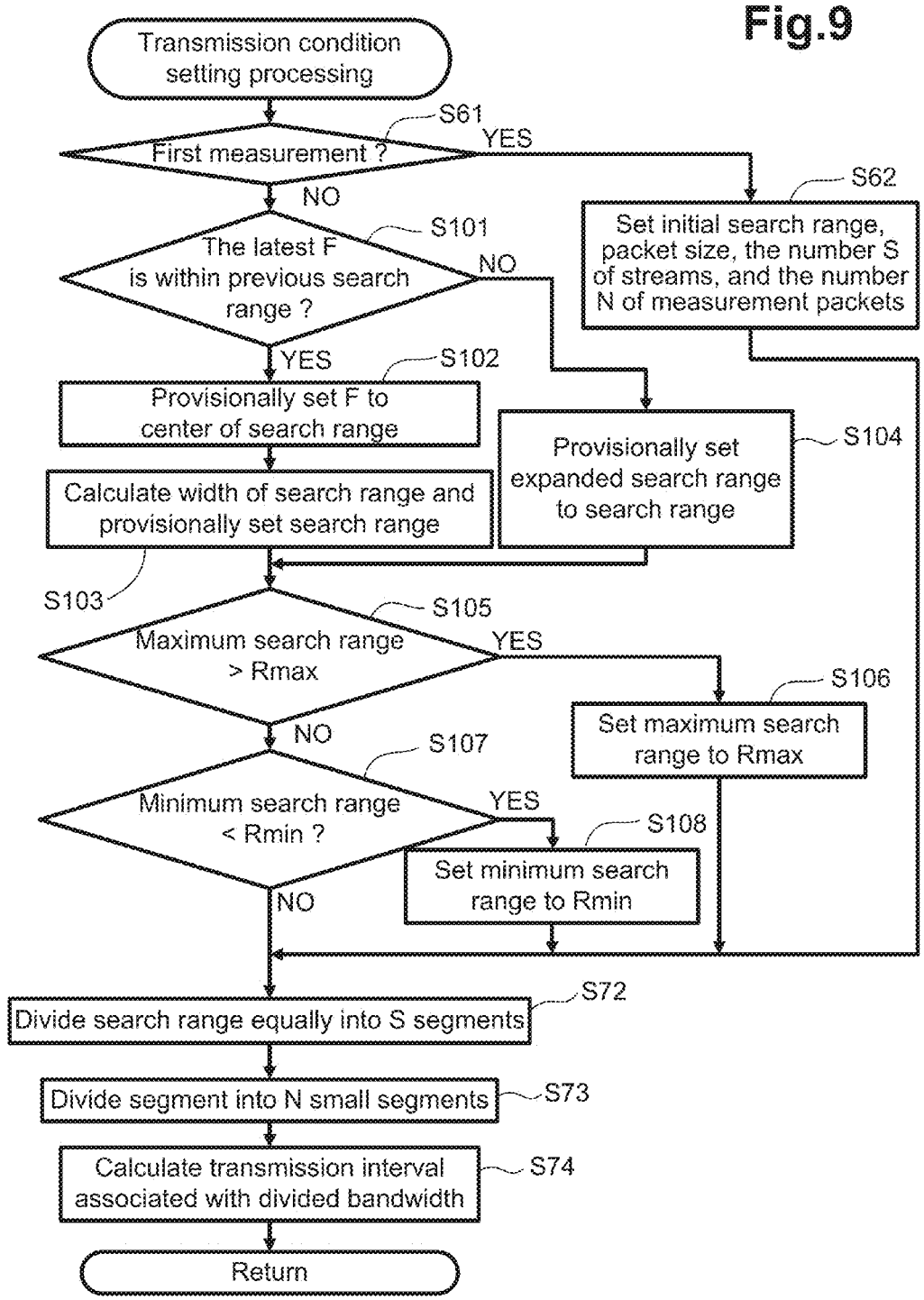

COMMUNICATION APPARATUS, METHOD FOR IMPLEMENTING COMMUNICATION, AND NON-TRANSITORY COMPUTER-READABLE MEDIUM

CROSS-REFERENCE TO RELATED APPLICATION

This application is a continuation-in-part of International Patent Application No. PCT/JP2011/056920, filed on Mar. 23, 2011, which claims the benefit of Japanese Patent Application No. 2010-079980, filed on Mar. 31, 2010, the disclosures of which are incorporated herein by reference.

BACKGROUND

1. Technical Field

Aspects described herein relates to a communication apparatus and a communication method, and a computer-readable medium storing computer-readable instructions for measuring network bandwidth when communicating via a network.

2. Description of the Related Art

When a communication apparatus transmits and receives data through the Internet or another network, a transfer speed of data needs to be suitable to an available bandwidth. The available bandwidth for example, bits per second (bps), varies depending on a region, or a provider, or a time zone, or other situations. The available bandwidth indicates an amount of data that the communication apparatus can transfer in a unit time via the network. Therefore, it is preferable for the communication apparatus that sends data to control the amount of data to be transferred in the unit time (bps) according to the varying available bandwidth. If the transfer speed of the data is equal to or lower than the available bandwidth, data congestion, or a packet loss, or other problems are less likely to occur.

In a related art, a measurement method is disclosed. The measurement method measures the varying available bandwidth while voice data and other media data are being transmitted and received among the communication apparatuses. In the conventional measurement method, a transmitting communication apparatus which transmits data first sets a search range. The search range indicates a search range of network bandwidth to measure the available bandwidth. The transmitting communication apparatus sets conditions under which a plurality of packets is transmitted to measure bandwidths within the set search range. The transmitting communication apparatus then transmits the plurality of packets to a receiving communication apparatus. Each of the plurality of packets includes time information in order to enable the receiving communication apparatus to calculate a packet transmission interval. The transmitting communication apparatus transmits the plurality of packets at the transmission interval in succession as the transmission interval is changed by the transmitting communication apparatus. The receiving communication apparatus records packet reception intervals. After that, a packet transmission interval calculated from the time information in the packet is determined. The reception interval recorded by the receiving communication apparatus is also determined. The difference between the packet transmission interval and the packet reception interval is calculated. A current bandwidth is measured from a tendency of changes in a plurality of calculated differences. Once a procedure of measuring the available bandwidth is finished, the next bandwidth search range is set on the basis of previous measurement results, and after that, the next measurement processing starts.

BRIEF SUMMARY

In the measurement method disclosed in the related art, the available bandwidth in the network is measured regardless of how wide a utilized bandwidth is. The utilized bandwidth indicates a network bandwidth being used by the communication apparatus. In the conventional measurement method, even if there is no possibility that the utilized bandwidth exceeds the available bandwidth because, for example, the utilized bandwidth is smaller than the available bandwidth, a high data transfer speed is set to measure the available bandwidth. As a result, an unnecessary load may be applied to the communication apparatuses and network.

Aspects described herein may provide a communication apparatus that comprises a processor and a memory. The memory is configured to store computer-readable instructions that, when executed, instruct the communication apparatus to execute steps comprising acquiring a type of transmission data referring to information of the transmission data, wherein the transmission data is data to be packetized and transmitted. The memory is configured to store computer-readable instructions that, when executed, instruct the communication apparatus to execute steps further comprising limiting a search range of the network bandwidth, in response to the acquired type of the transmission data, wherein the network bandwidth is measured by a transmission interval of a transmission of a plurality of packets via a network, and a reception interval of a reception of the plurality of packets via the network. The memory is configured to store further computer-readable instructions that, when executed, instruct the communication apparatus to execute steps further comprising setting the search range according to the limited search range, and transmitting a plurality of packets within the limited search range for measuring the network bandwidth.

According to other aspects, a method for implementing communication at a communication apparatus comprises the step of acquiring a type of transmission data referring to information about the transmission data, wherein the transmission data is data to be packetized and transmitted. The method further comprises the step of limiting a search range of a network bandwidth, in response to the acquired type of transmission data, wherein the network bandwidth is measured by a transmission interval of a transmission of a plurality of packets via a network, and a reception interval of a reception of the plurality of packets via the network. The method further comprises the steps of setting the search range according to the limited search range, and transmitting a plurality of packets within the limited search range for measuring the network bandwidth.

According to another aspect, a non-transitory computer-readable recording medium stores computer-readable instructions that, when executed, cause a communication apparatus to execute steps comprising acquiring a type of transmission data referring to information about the transmission data, wherein the transmission data is data to be packetized and transmitted. The non-transitory computer-readable recording medium stores computer-readable instructions that, when executed, cause the communication apparatus to further execute steps comprising limiting a search range of the network bandwidth, in response to the acquired type of transmission data, wherein the network bandwidth is measured by a transmission interval of a transmission of a plurality of packets via a network, and a reception interval of a reception of the plurality of packets via the network. The non-transitory computer-readable recording medium stores computer-readable instructions that, when executed, cause the communication apparatus to further execute steps comprising setting the search range according to the limited search range, and transmitting a plurality of packets within the limited search range for measuring the network bandwidth.

BRIEF DESCRIPTION OF THE DRAWINGS

FIGS. 2A, 2B, 2C and 2D schematically show data structure of a transmission data table stored in a hard disk drive (HDD).

FIG. 3 is a flowchart of transmission main processing carried out when a communication apparatus operates as a transmitting communication apparatus.

FIG. 4 is a flowchart of negotiation processing executed during the transmission main processing.

FIG. 5 is a flowchart of packet transmission processing carried out when a communication apparatus operates as a transmitting communication apparatus.

FIG. 9 is a flowchart of transmission condition setting processing carried out by a transmitting communication apparatus in a variation.

DETAILED DESCRIPTION

One embodiment is described hereinafter with reference to drawings. A communication apparatus 1 and a bandwidth measurement system 100 including a plurality of communication apparatuses 1 will be described with reference to the drawings.

Figure 1:
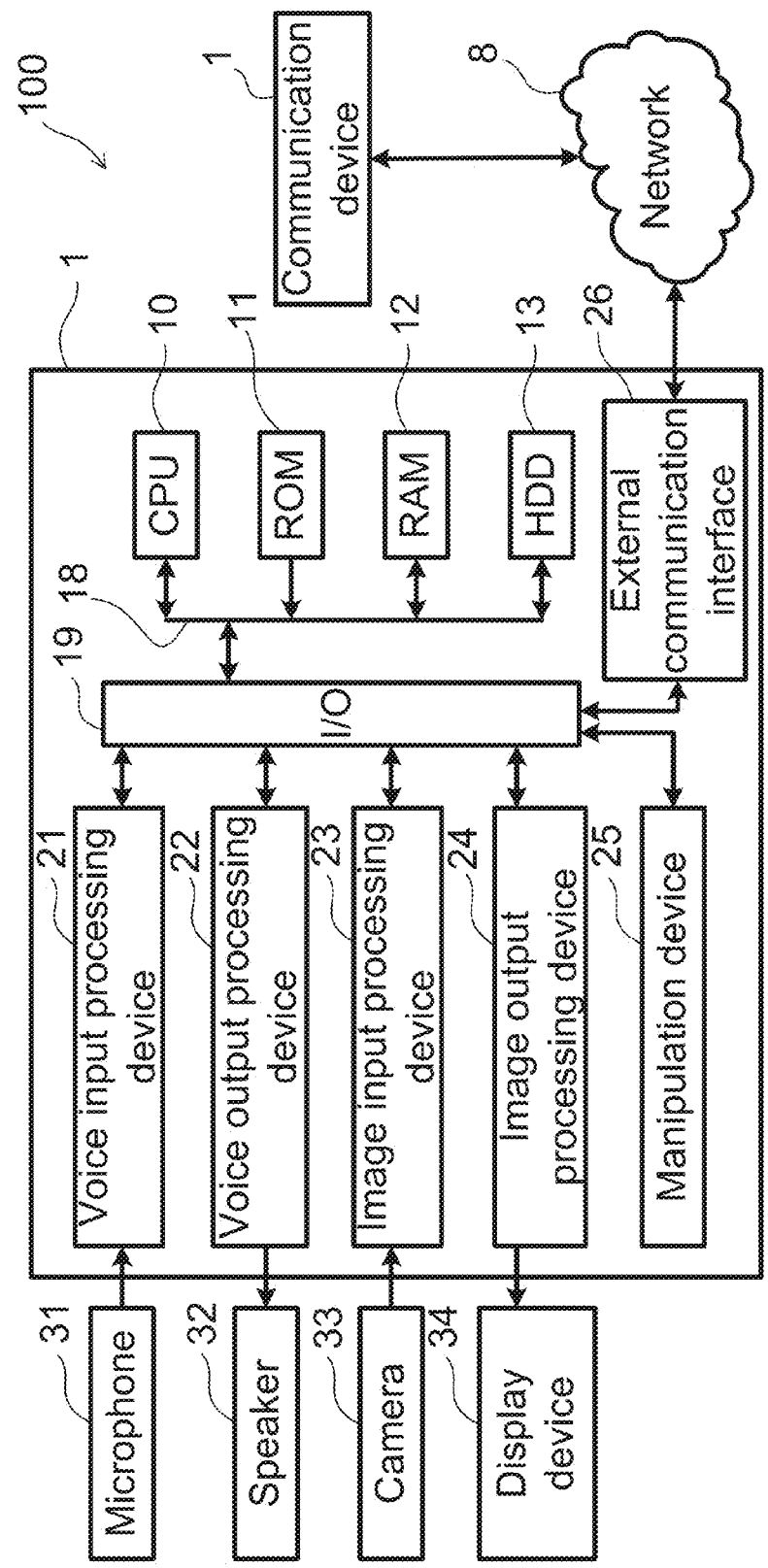
FIG. 1 is a block diagram showing an electric structure of a communication apparatus and a structure of a bandwidth measurement system.

As shown in FIG. 1, the bandwidth measurement system 100 includes at least two communication apparatuses 1. Each communication apparatus 1 is connected to another communication apparatus 1 through a network 8. The communication apparatus 1 transmits and receives various types of data to and from the other communication apparatus 1.

The bandwidth measurement system 100 in this embodiment may be a video conference system used by users at a plurality of hubs to hold a video conference. To implement a video conference, each communication apparatus 1 transmits and receives voice data and moving picture data to and from other communication apparatuses 1 to share voices and images at the plurality of hubs. Each communication apparatus 1 can also transmit and receive text data such as documents during the video conference. Users can continue the conference while seeing the same text as other users. The communication apparatus 1 may be any device if it can carry out data communication through the network 8. Specifically, the communication apparatus 1 may be a dedicated video conference terminal placed each hub to hold a video conference. Alternatively, the communication apparatus 1 may be a personal computer that carries out various types of information processing.

In the bandwidth measurement system 100, each communication apparatus 1 packetizes voice data and moving picture data and transmits the packetized data. And each communication apparatus 1 receives packetized data. The communication apparatus 1 can measure an available bandwidth. The communication apparatus 1 can also determine whether a utilized bandwidth has been ensured. The measurement of the available bandwidth and the determination as to whether the utilized bandwidth has been ensured will be collectively referred to below as "bandwidth measurement". The available bandwidth may be a maximum speed of receiving data by a receiving communication apparatus. In other words, the available bandwidth may be approximately equal to a transfer speed of data transmitted by a transmitting communication apparatus. The utilized bandwidth may be a bandwidth used by the transmitting communication apparatus to transmit data. To compare the network bandwidth and the transfer speed among the communication apparatuses, the network bandwidth is represented by a channel capacity (bps (bit per second)). If a packet is transmitted at a transfer speed exceeding the available bandwidth, a packet loss, or a transmission delay due to congestion, or another problem occurs. If the transfer speed of the communication apparatus 1 is too low, the communication apparatus 1 cannot adequately use the network bandwidth, lowering the efficiency. Therefore, each communication apparatus 1 controls the transfer speed according to the measured bandwidth. The electric structure of the communication apparatus 1 will be described below. As shown in FIG. 1, the communication apparatus 1 comprises a central processing unit (CPU) 10 that controls the communication apparatus 1. A read-only memory (ROM) 11, a random-access memory (RAM) 12, a hard disk drive (HDD) 13, and an input/output interface 19 are electrically connected to the CPU 10 through a bus 18.

The ROM 11 may pre-store a program, an initial value, and the like that operate the communication apparatus 1. The RAM 12 temporarily may store various types of information used by a control program. The HDD 13 may be a non-volatile storage unit that stores a transmission data table (see FIG. 2A to 2D) described later, and various types of information including the control program. An electrically erasable programmable ROM (EEPROM), a memory card, or another storage unit may be used instead of the HDD 13.

A voice input processing device 21, a voice output processing device 22, an image input processing device 23, an image output processing device 24, a manipulation device 25, and an external communication interface 26 are electrically connected to the input/output interface 19. The voice input processing device 21 processes voice data received from a microphone 31 to which a voice is input. The voice output processing device 22 processes the operation of a speaker 32 that outputs a voice. The image input processing device 23 processes moving picture data received from a camera 33 that captures an image. The image output processing device 24 processes the operation of a display apparatus 34 that displays the image. The manipulation device 25 is used by the user to input commands to the communication apparatus 1. The manipulation device 25 may be connected to the input/output interface 19 from the outside of the communication apparatus 1. The external communication interface 26 connects the communication apparatus 1 to the network 8.

Next, a bandwidth measurement method used by the bandwidth measurement system 100 in this embodiment will be generally described. The bandwidth measurement system 100 may use the bandwidth measurement method described in Tomoaki TSUGAWA et al., "Implementation and evaluation of an inline network measurement algorithm and its application technique", Technical Report of IEICE (IN2005-120), The Institute of Electronics, Information and Communication Engineers, December 2005, vol. 120, pp. 79-84, relevant portions of which are incorporated herein by reference.

The principle of measurement will be described below. In the bandwidth measurement system 100, the communication apparatus 1 that transmits data (referred to below as a transmitting communication apparatus) converts data to be transmitted into a plurality of packets. The transmitting communication apparatus transmits the plurality of packets in succession to another communication apparatus 1 (referred to below as a receiving communication apparatus) through the network 8. If a transfer speed (bps) at which packets are transmitted by the transmitting communication apparatus is not faster than the available bandwidth (bps) between the transmitting communication apparatus and the receiving communication apparatus, the packets may not be involved in congestion. If the packets are not involved in congestion, a reception interval at which the receiving communication apparatus receives the plurality of packets transmitted by the transmitting communication apparatus is theoretically equal to a transmission interval at which the transmitting communication apparatus transmits the plurality of packets. If the transfer speed is faster than the available bandwidth, the packets may be involved in congestion and the reception interval becomes longer than the transmission interval.

When measuring a bandwidth, the transmitting communication apparatus transmits a plurality of packets while gradually prolonging or shortening the transmission intervals. When a certain packet is transmitted by the transmitting communication apparatus, the transfer speed is obtained according to equation (1) below.

Transfer speed (bps)=packet size (bit)/time interval (second) between a time of a previous packet transmission and a time of a current packet transmission    (1)

If the transmitting communication apparatus transmits a plurality of packets while gradually prolonging the transmission intervals, the reception intervals may be longer than the transmission intervals as long as the transfer speed is faster than the available bandwidth.

However, if the transmission intervals are prolonged and the transfer speed is equal to or slower than the available bandwidth the reception interval may be equal to the transmission interval. Accordingly, the transfer speed of data at a point in time at which the value of (reception interval−transmission interval) changes can be measured as the available bandwidth.

A measurement procedure will be generally described below. In the bandwidth measurement system 100, a bandwidth can be measured as described below.

1. A search range of the network bandwidth is set.

The search range may represent a search range of the available bandwidth at the time of measurement. When the search range is limited, the available bandwidth can be efficiently measured. The communication apparatus 1 in this embodiment can limit the search range according to the type of data to be transmitted. As a result, even if the available bandwidth is significantly larger or smaller than the utilized bandwidth, therefore, the communication apparatus 1 can prevent the available bandwidth from being wastefully measured, as described below in detail.

2. The search range is divided into one or a plurality of segments.

When measuring the network bandwidth, the transmitting communication apparatus may transmit a plurality of packets (referred to below as a stream) for each divided segment. The stream may be transmitted in order to determine whether the segment includes a point in time at which the value of "reception interval−transmission interval" changes. As the number of divided segments becomes larger, the communication apparatus 1 can obtain a measurement result that is less affected by temporary abnormalities. This enables the communication apparatus 1 to determine a point in time at which the value of "reception interval-transmission interval" changes accurately. As the number of divided segments is smaller, a time required in measurement processing may be shorter. This enables the communication apparatus 1 to obtain a measurement result quickly.

3. A stream is transmitted and received between the transmitting communication apparatus and the receiving communication apparatus within the search range.

The communication apparatus 1 may determine a condition of transmitting the stream in order to measure the network bandwidth in the relevant segment. The transmission condition may include the number of packets in the stream (referred to below as the number of measurement packets), the size of each packet, and the transmission interval. The transmission interval may be a time from a time when a packet is transmitted to a time when the next packet is transmitted. In this embodiment, the network bandwidth may be sequentially searched from an upper limit of the search range to a lower limit of the search range, because the transmission interval may be gradually changed to be prolonged. The transmitting communication apparatus then may create a plurality of packets according to the determined transmission condition and transmit the created packets. Each packet may include time information for calculating the transmission interval by receiving communication apparatus.

4. A bandwidth is measured based on a difference between the reception interval and the transmission interval.

The reception interval may be calculated based on receiving times at which the receiving communication apparatus actually received the packets. The transmission interval may be calculated based on the time information included in the received packets. A relationship between a transfer speed of data at the time of packet transmission and a reception rate (bps) at the time of packet reception may be approximated with two straight lines by the linear regression method. As a result, a point at which the value of "reception interval−transmission interval" changes may be determined. If there is a point at which the value of "reception interval-transmission interval" changes, the data transfer speed at the time of the point may be determined as the available bandwidth. If there is no point of the change and the value of "reception interval−transmission interval" is zero over the entire search range, it may be determined that there is an available bandwidth in a range wider than the search range. In this embodiment, the receiving communication apparatus may notify the transmitting communication apparatus of the maximum value in the search range as a tentative measurement result (latest measurement result F shown in FIGS. 5 to 7). When the available bandwidth is wider than the search range, if the utilized bandwidth used by the transmitting communication apparatus is smaller the maximum value in the search range, the transmitting communication apparatus can ensure the utilized bandwidth. If there is no point of the change and the value of "reception interval-transmission interval" is positive over the entire search range, it may be determined that the available bandwidth is narrower than the search range. The receiving communication apparatus may notify the transmitting communication apparatus of the minimum value in the search range as a tentative measurement result F.

5. The processing returns to 1 above to set another search range and a bandwidth is measured again.

The next search range may be set according to the previous measurement results. As a result, the network bandwidth may be measured efficiently.

As described above, the communication apparatus 1 can measure the network bandwidth while transmitting or receiving packets including voice data and other data. That is, the communication apparatus 1 can measure the network bandwidth by using the transmission interval and the reception interval of packets. If the search range is set so that the search range includes the available bandwidth, the communication apparatus 1 can measure the value of the available bandwidth while executing a video conference. However, there may be a case in which it is sufficient for the communication apparatus 1 to recognize only whether the available bandwidth is larger than the utilized bandwidth (that is, whether the utilized bandwidth has been ensured). For example, even if the utilized bandwidth and available bandwidth is changeable, if the available bandwidth is larger than the maximum value of the utilized bandwidth, a transmission delay or another problem may be not caused. The maximum value of the utilized bandwidth may be referred to below as the maximum utilized bandwidth. Accordingly, the communication apparatus 1 does not need to recognize the value of the available bandwidth. If the utilized bandwidth is larger than the available bandwidth and packets are transmitted at a high transfer speed to measure the available bandwidth, an unnecessary load may be applied to the communication apparatus 1 and network 8. When the communication apparatus 1 sets an appropriate search range, the communication apparatus 1 can prevent an unnecessary load from being applied to the communication apparatus 1 and network 8. The structure of data stored in the communication apparatus 1 and processing carried out by the communication apparatus 1 will be described below in detail.

The data structure of the transmission data table stored in the HDD 13 in the transmitting communication apparatus will be described with reference to FIG. 2A, FIG. 2B, FIG. 2C, and FIG. 2D. The transmission data table may store, information about the utilized bandwidth used when the communication apparatus 1 transmits data for each type of data to be transmitted. The data that the communication apparatus 1 can transmit and receive includes voice data, moving picture data, text data, pointer position data, and control information. The voice data, for example, is classified into six types according to a type of codec, a sampling rate, and the size of one frame. Similarly, the moving picture data and other data are classified into one type or a plurality of types. The communication apparatus 1 transmits any of the one type of data or the plurality of types of data to the receiving communication apparatus according to performance of the receiving communication apparatus, an instruction from the user of the communication apparatus 1, or the like. The left side relative to the center in FIG. 2A, FIG. 2B, FIG. 2C, and FIG. 2D for example, "Voice data" or "Moving picture data" or "Text data" or "Pointer position information" or "Control information" represents data types.

Each data type is associated with information about the utilized bandwidth. The information about the utilized bandwidth may include a lower bandwidth limit, an upper bandwidth limit, an average bandwidth, and dispersion. The lower bandwidth limit and upper bandwidth limit, which are predetermined for each data type, respectively indicate the lower limit and upper limit of the utilized bandwidth used to transmit data. The communication apparatus 1 can limit the search range using the sum of the upper bandwidth limit of one type of data or a plurality of types of data to be transmitted and the minimum value of the lower bandwidth. CBR in FIG. 2A, an acronym for Constant Bit Rate, may indicate that the data is to be transmitted at constant speed.

The average bandwidth may be an average of utilized bandwidths that the communication apparatus 1 used to actually transmit data. The communication apparatus 1 may acquire the utilized bandwidth during data transmission for each data and calculates an average of the utilized bandwidths. The communication apparatus 1 may update the average bandwidth in the transmission data table. The dispersion may indicate the dispersion of utilized bandwidths that the communication apparatus 1 used to actually transmit data. The communication apparatus 1 may calculate the dispersion from the values of the utilized bandwidths that the communication apparatus 1 acquired during data transmission and store the calculated dispersion in the transmission data table. The communication apparatus 1 can limit the search range based on the average bandwidth and dispersion.

Transmission main processing and packet transmission processing will be described with reference to FIGS. 3 to 6. The transmission main processing and packet transmission processing are executed when the communication apparatus 1 operates as the transmitting communication apparatus. The transmission main processing and packet transmission processing are executed by the CPU 10 in the transmitting communication apparatus according to the program stored in the HDD 13. The transmission main processing is executed when a command for data transmission and reception to and from the receiving communication apparatus is entered to the communication apparatus 1. The packet transmission processing is carried out concurrently with the transmission main processing under the condition that processing to start bandwidth measurement is carried out during the transmission main processing.

When the transmission main processing is started, an application to hold a video application is activated (S1), as shown in FIG. 3. A call is connected between the transmitting communication apparatus and the receiving communication apparatus, resulting in a state in which packets can be transmitted to and from the receiving communication apparatus (S2). A negotiation processing is then carried out (S3). In the negotiation processing, the type of data to be transmitted and received between the transmitting communication apparatus and the receiving communication apparatus is determined, after which setting to limit the search range is carried out. A processing to start bandwidth measurement then starts, as described in detail later with reference to FIG. 4.

Upon completion of the negotiation processing (S3), non-text data is mutually transmitted and received between the transmitting communication apparatus and the receiving communication apparatus, and a video call is made (S4). Main examples of non-text data are voice data and moving picture data. The transfer speed of data being transmitted is acquired as the utilized bandwidth for each data type (S5). An average utilized bandwidth, which is an average of the acquired utilized bandwidth and previous utilized bandwidths, and dispersion of the utilized bandwidths are calculated for each data type (S6). The transmission data table (see FIG. 2A to 2D) is updated according to the calculation results (S7). Weather a command to clear the call between the transmitting communication apparatus and the receiving communication apparatus has been entered is decided (S8). If a command to clear the call has not been entered (the result in S8 is No), whether a command to add a type of data to be transmitted has been entered is decided (S9). Specifically, in this embodiment, it is decided whether a command to share text data that the transmitting communication apparatus possesses has been entered during the video conference. In the video conference, voices and moving pictures are usually used. If a command to add a type of data has not been entered (the result in S9 is No), the sequence returns to S4 and processing in S4 to S9 is repeated.

If a command to add a data type has been entered (the result in S9 is Yes), a processing to suspend the bandwidth measurement is carried out (S11), after which the negotiation processing as in S3 is carried out (S12). In the negotiation processing in S12, the processing to limit the search range is carried out again and the bandwidth measurement is resumed. Data including text data is transmitted and received to and from the receiving communication apparatus (S13). A utilized bandwidth is acquired for each type of data being transmitted (S14). An average utilized bandwidth and dispersion are calculated for each data type (S15). The transmission data table is updated according to the calculation results (S16). Whether a command to reduce types of data to be transmitted has been entered is then decided (S17). Specifically, whether a command to share text data has been entered is decided. If a command to reduce types of data has not been entered (the result in S17 is No), the sequence returns to S13. If a command to reduce types of data has been entered (the result in S17 is Yes), the setting by which the search range is limited is returned to the setting before the data type was added (S18). The sequence then returns to S4.

If a command to clear the call between the transmitting communication apparatus and the receiving communication apparatus has been entered (the result in S8 is Yes), a processing to terminate the bandwidth measurement is carried out (S21). The call is then cleared (S22). The processing to terminate the application is carried out (S23), terminating the transmission main processing.

The negotiation processing executed during the transmission main processing will be described with reference to FIG. 4. To determine the type of data to be transmitted and received between the transmitting communication apparatus and the receiving communication apparatus in this embodiment, an offer or answer model using the session description protocol (SDP) is used. An offer, indicating a list of types of data that the transmitting communication apparatus can send and a list of types of data the transmitting communication apparatus can receive, is first transmitted to the receiving communication apparatus (S31). An answer, indicating a list of types of data that the receiving communication apparatus can send and a list of types of data that the receiving communication apparatus can receive, is then received from the receiving communication apparatus (S32). Types of data to be transmitted to the receiving communication apparatus are determined and a list of the determined types of data to be transmitted is retrieved from the transmission data table (see FIG. 2A to 2D) (S33).

Whether the use of dispersion of utilized bandwidths has been set to limit the search range is decided (S34). The communication apparatus 1 in this embodiment can use two methods of limiting the search range. In one method, the maximum utilized bandwidth and minimum utilized bandwidth are used. In the other method, the average utilized bandwidth and dispersion of utilized bandwidths are used. The user presets one of the two methods with the manipulation device 25. Which method has been set is decided in S34.

If the use of dispersion has not been set (the result in S34 is No), the processing to use the maximum utilized bandwidth and minimum utilized bandwidth to limit the search range is carried out. First, the upper bandwidth limits for all data types in the data acquired from the transmission data table are added to calculate the maximum utilized bandwidth (S35). The calculated maximum utilized bandwidth is set as an upper limit Omax of the center of the search range (S36). In a transmission condition setting processing (see FIG. 6), the transmitting communication apparatus sets the search range so that the center of the search range does not exceed Omax, as described later in detail. As a result, the search range is limited. The minimum value of the lower bandwidths for all data types is set as a lower limit Omin of the center of the search range (S37).

If the use of dispersion has been set (the result in S34 is Yes), the processing to use an average utilized bandwidth and dispersion to limit the search range is carried out. First, the average utilized bandwidths for all data types in the data acquired from the transmission data table are added (S38). Dispersions for all data types are then added (S39). The sum of the total H of the average utilized bandwidths and the value obtained by multiplying the total B of the dispersions by three is calculated. The calculated value of (H+3B) is set as the upper limit Omax of the center of the search range (S40). A value of (H−3B) is calculated and is set as the lower limit Omin of the center of the search range (S41).

Since the value obtained by multiplying the total B of the dispersions by three is statistically used, the values of Omin and Omax can be set so that about 99.7% of the utilized bandwidths fall within the range from Omin to Omax. As a result, the range from Omin to Omax can be set to an appropriate range within which the utilized bandwidth falls with a high probability. When the utilized bandwidth becomes Omax or below, the obtained measurement result may only indicate that the value of the available bandwidth is larger than Omax (that is, the value of the available bandwidth could not be measured). Even in this case, the communication apparatus 1 can recognize that the utilized bandwidth has been ensured. The multiplier by which the total B of the dispersions is multiplied is not limited to 3. Upon completion of setting the Omax and Omin, bandwidth measurement is started (S42) and the sequence returns to the transmission main processing.

The packet transmission processing will be described below with reference to FIGS. 5 and 6. As described above, when the processing to start bandwidth measurement (S42 in FIG. 4) in the transmission main processing is carried out, the transmitting communication apparatus executes the packet transmission processing concurrently with the transmission main processing. As shown in FIG. 5, it is first decided whether either processing to terminate the bandwidth measurement has been carried out (S21 in FIG. 3) or processing to suspend the bandwidth measurement has been carried out (S11 in FIG. 3) (S51). If neither processing to terminate the bandwidth measurement nor processing to suspend the bandwidth measurement has been carried out (the result in S51 is No), the transmission condition setting processing is carried out (S52).

Figure 6:
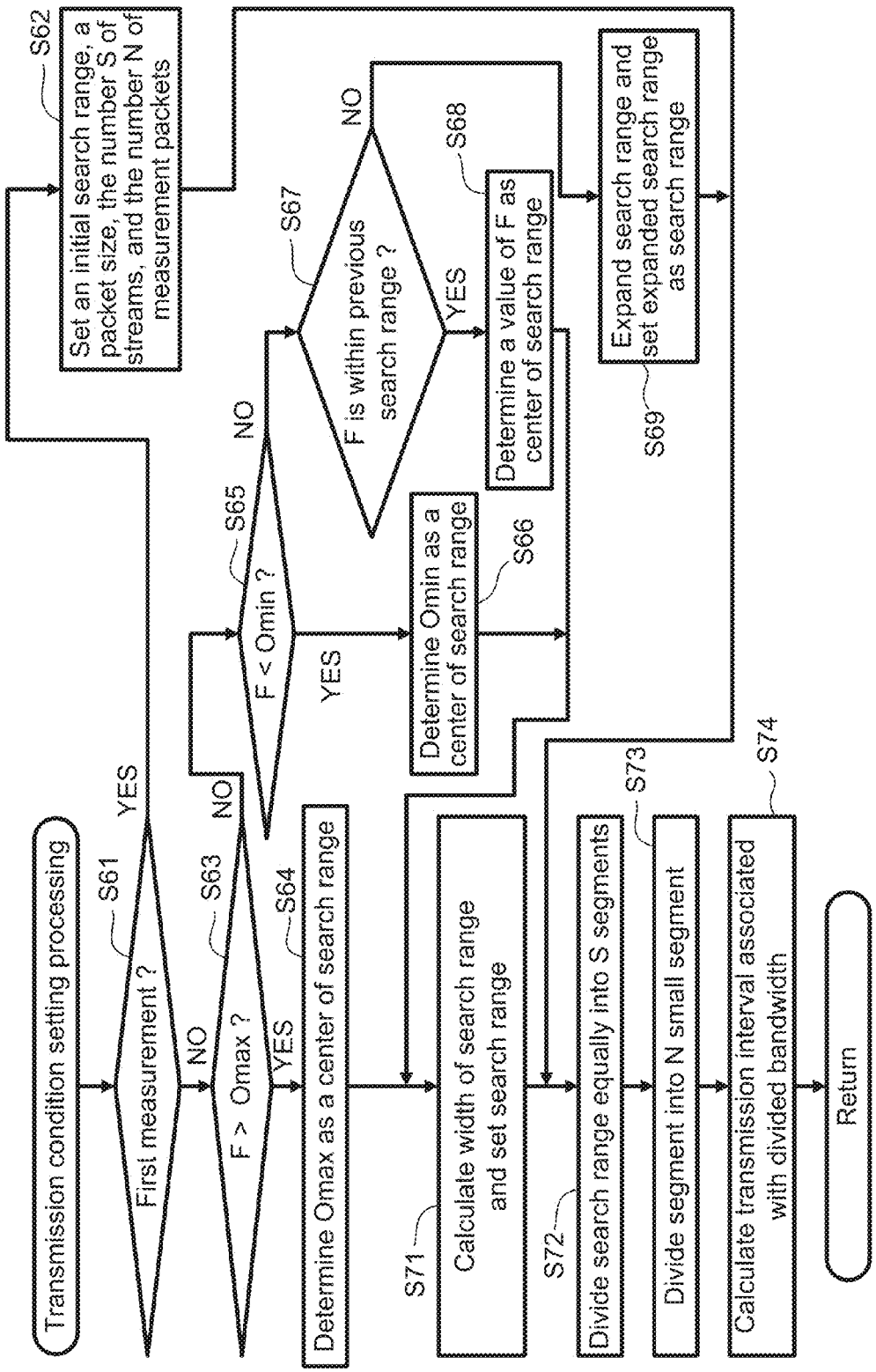
FIG. 6 is a flowchart of transmission condition setting processing executed during the packet transmission processing.

As shown in FIG. 6, when the transmission condition setting processing is started, it is decided whether the bandwidth measurement is a first one carried out between the transmitting communication apparatus and the receiving communication apparatus (S61). That is, it is decided whether the bandwidth between the transmitting communication apparatus and the receiving communication apparatus has been measured at least once. If the bandwidth measurement is a first one (the result in S61 is Yes), an initial search range, a packet size, the number S of streams, and the number N of measurement packets are set to prescribed values (S62). In this embodiment, default values are used as the prescribed values. However, the method of setting these values can be changed. For example, the initial search range may be set according to the bandwidth measured by another bandwidth measurement method.

If the bandwidth measurement is not a first one (the result in S61 is No), the next search range, which is a search range in next bandwidth measurement processing, is set according to the value of the latest measurement result F. The transmitting communication apparatus has been notified of the value of the latest measurement result F by the receiving communication apparatus. The bandwidth between the transmitting communication apparatus and the receiving communication apparatus is measured by the receiving communication apparatus, as described later in detail. The transmitting communication apparatus receives a measurement result and recognizes the bandwidth. If the latest measurement result F is at least Omin and at most Omax, the transmitting communication apparatus sets the next search range by using the latest measurement result F or the previously set search range, which has been set to measure the latest measurement result F. The transmitting communication apparatus can then set an appropriate search range used to measure the available bandwidth as the next search range. A processing for this setting is described in the document indicated above. If the latest measurement result F is smaller than Omin or larger than Omax, the central position of the next search range is limited. This prevents the available bandwidth from being wastefully measured, as described below in detail.

First, whether the value of the latest measurement result F is larger than the Omax setting is decided (S63). If the value is larger than Omax (the result in S63 is Yes), Omax is determined as a value at which the center of the next search range is positioned (S64). If the value of the latest measurement result F is smaller than Omax (the result in S63 is NO), whether the value of F is smaller than Omin is decided (S65). If the value of F is smaller than Omin (the result in S65 is Yes), Omin is determined as a value at which the center of the next search range is positioned (S66). That is, the transmitting communication apparatus limits the central position of the search range in S63 to S66 to limit the search range.

If the value of the latest measurement result F is not smaller than Omin (the result in S65 is No), whether the value of F is present in the previously set search range is decided (S67). If the value of F is present in the previously set search range (the result in S67 is Yes), the value of the latest measurement result F is determined as a value at which the center of the next search range is positioned (S68). The search range used in S67 excludes the upper limit and lower limit of the search range.

After the value at which the center of the next search range is positioned has been determined, the width D of the search range is calculated from accumulated bandwidth measurement results and the next search range is set (S71). Specifically, if the value at which the center of the next search range is positioned is denoted as C, the minimum value of the next search range is (C−D/2) and the maximum value is (C+D/2). The width D of the next search range is calculated according to an equation (2) below as in the method described in the document indicated above. In equation (2), α is dispersion of a plurality of accumulated measurement results, including one measurement result, and β is the square root of the number of the plurality of accumulated measurement results, including one measurement result.

$$D = 2 \times 1.96 \times \alpha / \beta \qquad (2)$$

If the measurement results become stable and the calculated value of D becomes smaller than a preset minimum width Dmin, Dmin is used as the width of the next search range. The sequence then proceeds to S72.

If the value of the latest measurement result F is at least Omin and at most Omax and is outside the previous search range (the result in S67 is No), either the maximum value or minimum value of the previous search range is changed to expand the search range and the expanded search range is set as the next search range (S69). The sequence then proceeds to S72. Specifically, when the available bandwidth is larger than the upper limit of the previous search range, the upper limit of the previous search range is tentatively used as the latest measurement result F, as described above. If the value of the latest measurement result F is the upper limit, of the previous search range, that has been reported as a tentative measurement result, the maximum value Bu' in the next search range is calculated by using the maximum value Bu and minimum value Bl in the previous search range, according to an equation (3) below. As a result, the next search range is expanded to a search range in which a bandwidth larger than the previous bandwidth can be measured. The value of Bl is used as the minimum value Bl' in the next search range as it is.

$$Bu' = Bu + (Bu - Bl)/2 \qquad (3)$$

If the value of the latest measurement result F is the lower limit, of the previous search range, that has been reported as a tentative measurement result, the minimum value Bl' of the next search range is calculated according to an equation (4) below. As a result, the next search range is expanded to a search range in which a bandwidth smaller than the previous bandwidth is measured. The value of Bu in the previous search range is used as the maximum value Bl' in the next search range as it is.

$$Bl' = Bl - (Bu - Bl)/2 \qquad (4)$$

After the next search range has been set, the search range is equally divided into S segments, the number of which is equal to the number of streams (S72). When the number S of streams is 1, the entire search range is handled as the segment as it is. Each divided segment is further divided by N, which is the number of packets constituting a stream (S73). As a result, a search bandwidth Ki (i=1, . . . , N−1), which is the value of the bandwidth that each measurement packet searches for, is uniquely determined. A transmission interval of each measurement packet is calculated (S74). The transmission interval of each measurement packet is used to find the search bandwidth Ki (bps) of a divided bandwidth. The transmission interval used to find the search bandwidth Ki is obtained by using the size (in bits) of a measurement packet as Ps according to an equation (5) below. The transmission interval is a lapse of time measured after the previous measurement packet has been transmitted. The sequence then returns to the packet transmission processing.

$$Ps/Ki \qquad (5)$$

Referring again to FIG. 5, upon completion of the transmission condition setting processing (S52), the receiving communication apparatus is notified of the number N of measurement packets and the number S of streams (S53). A packet with the preset packet size Ps is generated (S54). The measurement packet includes transmission data such as voice data, information about a packet number, and time information used to calculate a transmission interval from the transmission of the previous measurement packet. The packet number is a serial number assigned to a measurement packet to indicate its position in the sequence of the measurement stream. A wait equal to the transmission interval setting is inserted (S55). After the wait time has elapsed, the generated measurement packet is transmitted to the receiving communication apparatus (S56). Then, whether all N×S measurement packets have been transmitted is decided (S57). If all N×S measurement packets have not been transmitted (the result in S57 is No), the processing in S54 to S56 is repeated. If all N×S measurement packets have been transmitted (the result in S57 is Yes), the latest measurement result F is received from the receiving communication apparatus (S58) and the sequence returns to S51 to decide whether the processing to terminate or suspend the bandwidth measurement has been carried out. If the processing to terminate or suspend the bandwidth measurement has been carried out (the result in S51 is Yes), the packet transmission processing is terminated.

Figure 7:
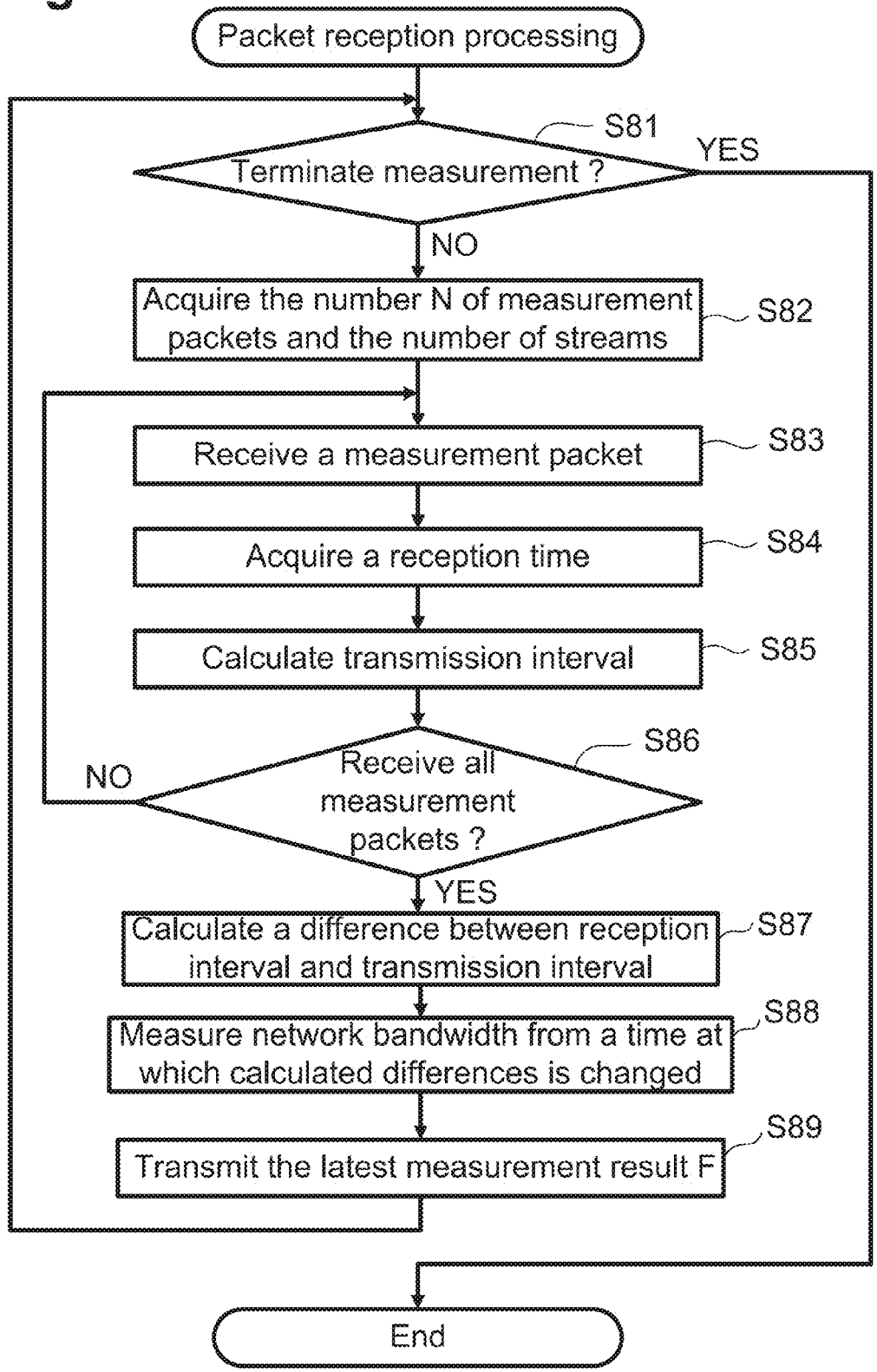
FIG. 7 is a flowchart of packet reception processing carried out when a communication apparatus operates as a receiving communication apparatus.

Next, a packet reception processing will be described with reference to FIG. 7. The packet reception processing is executed when the communication apparatus 1 operates as a receiving communication apparatus. That is, the communication apparatus 1 can operate as both a transmitting communication apparatus and a receiving communication apparatus. When data transmission and reception between the receiving communication apparatus and the transmitting communication apparatus is commanded, the packet reception processing is executed by the CPU 10 in the receiving communication apparatus according to the program stored in the HDD 13.

When the packet reception processing is started, whether a command to terminate reception of packets used to measure a bandwidth has been entered is decided (S81). If no termination command has been entered (the result in S81 is No), data indicating the number N of measurement packets and the number S of streams is received from the transmitting communication apparatus and the values of S and N are recognized (S82). A measurement packet is then received (S83) and a time at which the measurement packet was received is acquired as a reception time (S84). A packet number is extracted from data included in the received measurement packet and a transmission interval is calculated (S85). Then, whether all N×S measurement packets have been received is decided (S86). If all N×S measurement packets have not been received (the result in S86 is No), processing in S83 to S85 is repeated.

If all N×S measurement packets have been received (the result in S86 is Yes), a difference between the reception interval and the transmission interval is calculated for each packet number (S87). A network bandwidth is measured from a change in calculated differences (S88). Specifically, a point in time at which the difference of (reception interval-transmission interval) started to change is detected by the linear regression method. If a point of a change is detected, the bandwidth Ki at the time of the change is handled as the measurement result F in the available bandwidth. If a point of a change is not detected, whether the difference over the entire search range has been substantially 0 is decided. If the difference has been substantially 0, the available bandwidth is decided to be larger than the maximum value in the search range. The maximum value in the search range is used as a tentative measurement result F. If the utilized bandwidth to be used by the transmitting communication apparatus is smaller than the maximum value in the search range, the transmitting communication apparatus does not necessarily have to recognize the value of the available bandwidth. This is because if the transmitting communication apparatus recognizes that the available bandwidth is larger than the maximum value of the search range, the transmitting communication apparatus can decide that the utilized bandwidth can be ensured without having to recognize the value of the available bandwidth. If the difference of (reception interval-transmission interval) is substantially positive over the entire search range, the available bandwidth is determined to be lower than the search range. The minimum value of the search range is set as a tentative measurement result F. After the network bandwidth has been measured, the latest measurement result F is transmitted to the transmitting communication apparatus (S89) and the sequence returns to S81 to decide whether a command to terminate bandwidth measurement has been entered. If a command to terminate bandwidth measurement has been entered (the result in S81 is Yes), the packet reception processing is terminated.

A relationship among the search range set by the communication apparatus 1, the available bandwidth, and the utilized bandwidth will be described with reference to FIG. 8. When the communication apparatus 1 operates as the transmitting communication apparatus, the communication apparatus 1 sets the upper limit Omax and lower limit Omin of the center of the search range with reference to the information in the transmission data table (see FIG. 2A to 2D). In the non-W time zones shown in FIG. 8, the latest bandwidth measurement result is at least Omin and at most Omax. In the non-W time zones, therefore, the communication apparatus 1 does not limit the central position of the search range. The communication apparatus 1 sets the latest bandwidth measurement result as the center of the next search result. Therefore, the transmitting communication apparatus can set the search range in the vicinity of the latest bandwidth measurement result. The receiving communication apparatus can thereby efficiently measure the value of the available bandwidth accurately.

Figure 8:
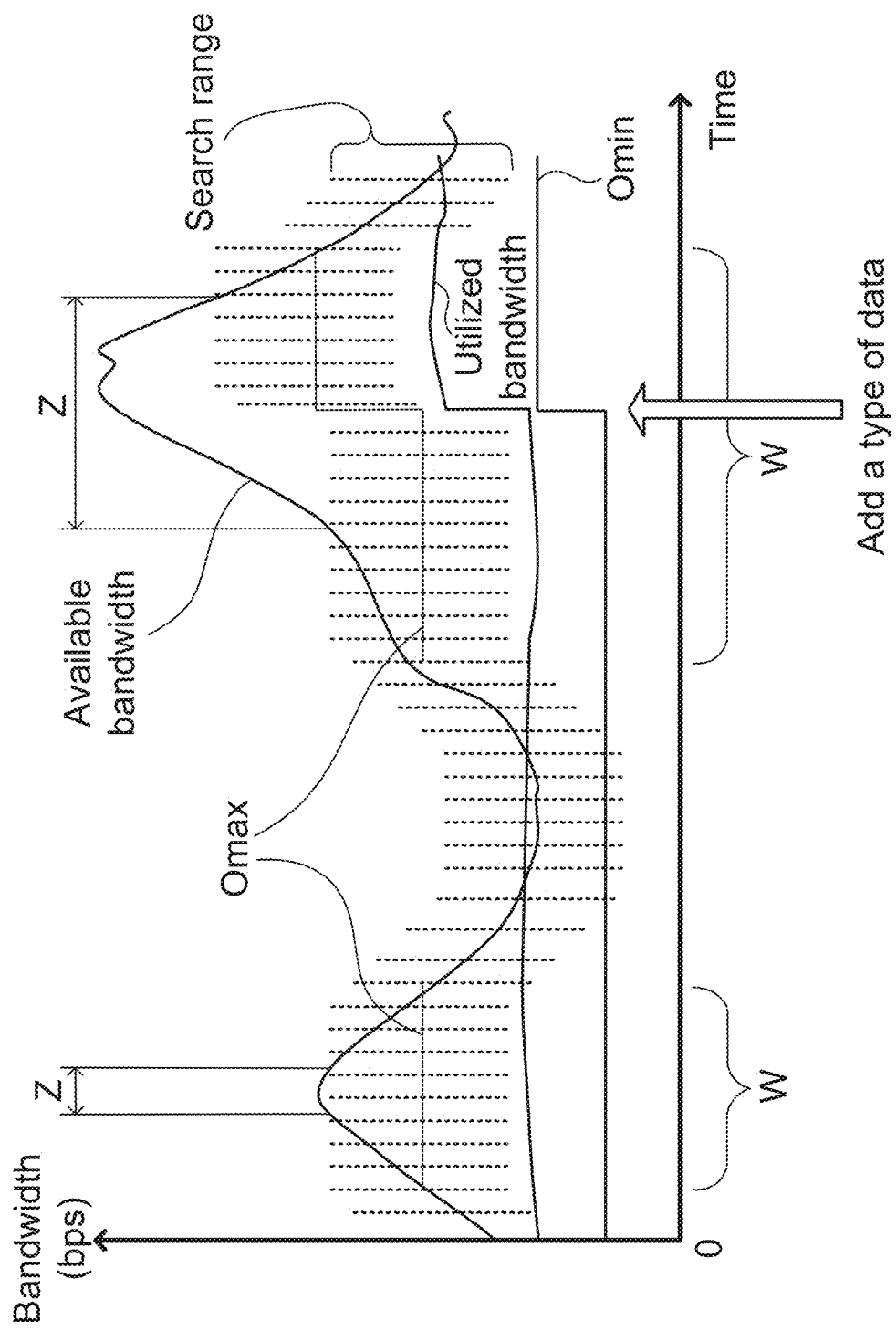
FIG. 8 illustrates an example of a relationship among available bandwidths, utilized bandwidths, and search ranges set by the transmitting communication apparatus.

In the time zones W in FIG. 8, the latest bandwidth measurement result is larger than Omax. Specifically, in the time zones W in FIG. 8, the value of the available bandwidth or the maximum value in the search range is larger than Omax, so the communication apparatus 1 uses Omax, which has been set as the upper limit, as the central position in the next search range. As a result, in the time zones Z shown in FIG. 8, wasteful measurement of available bandwidths significantly larger than the utilized bandwidth is prevented. That is, in the time zones Z in FIG. 8, the available bandwidth is larger enough for the possibility of the utilized bandwidth exceeding the available bandwidth to become negligible. The communication apparatus 1 has only to recognize that a utilized bandwidth has been ensured and does not need to measure the available bandwidth. If the available bandwidth is not wastefully measured, an unnecessary load is not applied to the transmitting communication apparatus, receiving communication apparatus, or network 8. Accordingly, the communication apparatus 1 can measure a bandwidth efficiently according to transmitted data. That is, the communication apparatus 1 can easily recognize that a utilized bandwidth has been ensured.

If the type of data to be transmitted is changed as shown in FIG. 8, the communication apparatus 1 sets the values of Omax and Omin again. Even if the type of data to be transmitted is changed, therefore, the communication apparatus 1 can appropriately limit the search range according to the type of changed data.

As described above, the communication apparatus 1 in this embodiment limits the search range according to the type of data to be transmitted. Therefore, the communication apparatus 1 can set an appropriate search range according to the type of data to be transmitted. Specifically, the communication apparatus 1 sets the center of the search range so that the center does not exceed the maximum utilized bandwidth. This can efficiently prevent available bandwidths significantly larger than the maximum utilized bandwidth from being wastefully measured. The available bandwidth significantly larger than the maximum utilized bandwidth means the available bandwidth that is large enough for the possibility of the utilized bandwidth exceeding the available bandwidth to become negligible. The communication apparatus 1 can also use the average and dispersion of utilized bandwidths to limit the search range. The communication apparatus 1 can efficiently prevent available bandwidths from being wastefully measured by a statistical method in which the average and dispersion of utilized bandwidths are used. In a range that is D/2 (D: width of the search range) larger than the maximum utilized bandwidth or than the value of (H+3B) calculated from the average and dispersion, the communication apparatus 1 can measure the available bandwidth. The available bandwidth may be temporarily increased. Even in this case, if the amount of increase of the available bandwidth is at most D/2, the communication apparatus 1 can quickly determine, from already measured results, whether an increased utilized bandwidth has been ensured.

The communication apparatus 1 sets the value of Omax each time the type of data to be transmitted is changed. This enables the communication apparatus 1 to appropriately limit the search range according to the type of new data to be transmitted. The communication apparatus 1 sets a transmission interval used for bandwidth measurement in the set search range, the number N of measurement packets, and the packet size Ps. The communication apparatus 1 creates packets according to the set conditions and transmits the created packets. Therefore, the communication apparatus 1 enables the receiving communication apparatus to accurately measure bandwidths in the set search range.

The present invention is not limited to the above embodiment; many variations are possible. A variation of the above embodiment will be described below with reference to FIG. 9. In the variation shown in FIG. 9, the method of setting a search range (S101 to S108) differs from the setting method (S63 to S71) in FIG. 6. In FIG. 9, the same structures and processing as in FIG. 6 are assigned the same step numbers as in FIG. 6 and their description will be omitted or simplified.

First, the negotiation processing (see FIG. 4) executed by the communication apparatus 1 in the variation will be described. In S36 in the negotiation processing in the variation, the maximum utilized bandwidth is not the upper limit Omax of the center of the search range. In the variation, the maximum utilized bandwidth is set to an upper limit Rmax at which the maximum value of the search range is positioned. In S37, the minimum utilized bandwidth is not the lower limit Omin of the center of the search range. In the variation, the minimum utilized bandwidth is set to a lower limit Rmin at which the minimum value of the search range is positioned. Similarly, in S40, the value of (H+3B) is set to Rmax. In S41, the value of (H−3B) is set to Rmin.

As shown in FIG. 9, in transmission condition setting processing in the variation, if the bandwidth measurement is not decided to be a first one (the result in S61 is No), whether the value of the latest measurement result F is within the previous search range (S101) is decided. If the value of F is within the previous search range (the result in S101 is Yes), the center of the next search range is provisionally set to the value of F regardless of the values of Rmax and Rmin (S102). The width of the search range is calculated and the next search range centered on the value of F is provisionally set (S103). The processing to calculate the width of the search range in S103 is the same as the processing in S71 (see FIG. 6) in the above embodiment. If the value of the latest measurement result F is outside the previous search range (the result in S101 is No), either the maximum value or minimum value of the previous search range is changed so that the range is expanded as in S69 (see FIG. 6) in the above embodiment and the expanded search range is tentatively set as the next search range (S104).

Next, whether the maximum value of the provisionally set search range is larger than Rmax is decided (S105). If the maximum value is larger than Rmax (the result in S105 is Yes), the width of the search range is not changed. That is, the next search range is set again so that the maximum value of the search range matches Rmax (S106). If the maximum value is equal to or smaller than Rmax (the result in S105 is No), whether the minimum value of the provisionally set search range is smaller than Rmin is decided (S107). If the minimum value is smaller than Rmin (the result in S107 is Yes), the width of the search range is not changed. That is, the next search range is set again so that the minimum value of the search range matches Rmin (S108). If the minimum value is equal to or greater than Rmin (the result in S107 is No), the provisionally set search range is used as the next search range as it is and the sequence proceeds to S72.

As described above, the communication apparatus 1 may use the maximum utilized bandwidth or dispersion of utilized bandwidths to limit the upper limit at which the maximum value of the search range is positioned. When the communication apparatus 1 sets the upper limit at which the maximum value of the search range is positioned, it is possible to further lower the possibility that available bandwidths larger than the utilized bandwidth are measured. Accordingly, the communication apparatus 1 can efficiently measure bandwidths according to the data to be transmitted.

Another variation of the embodiment described above is also possible. For example, the communication apparatus 1 uses part of the bandwidth measurement method described in the document indicated above. Even when the communication apparatus 1 uses a method other than the bandwidth measurement method described in the document indicated above, the technique in the disclosure can be applied. For example, the technique can also be applied to the so-called packet pair method, by which a bandwidth is measured from the transmission interval and reception interval of two packets and to the so-called train-based method, by which a bandwidth is measured from the transmission intervals and reception intervals of three packets. That is, the technique can be applied to any method other than the method described in the document indicated above if the network bandwidth can be measured by using a transmission interval/intervals and a reception interval/intervals of a plurality of packets while media data is being transmitted and received.

To limit a search range by using a statistical method, the communication apparatus 1 calculates (H+3B) and (H−3B) from the average utilized bandwidth H and the total B of the dispersions and sets the calculated values as the values of Omax and Omin or the values of Rmax and Rmin. However, the communication apparatus 1 may calculate a standard deviation of utilized bandwidths to set the sum of the calculated standard deviation and the average utilized bandwidth as the value of Omax or Rmax and set the difference between the average utilized bandwidth and the calculated standard deviation as the value of Omin or Rmin. By using the standard deviation, the communication apparatus 1 can efficiently limit the search range. In the case in which the total B of the dispersions is used, the multiplier by which the total B of the dispersions is not limited to 3, as described above.

The bandwidth measurement in this embodiment is not limited to the measurement of available bandwidths. Whether a bandwidth suitable for communication has been ensured may be decided. The network bandwidth suitable for communication is a bandwidth that enables a packet transmission time delay caused by the utilized bandwidth to fall within an allowable range. Preferably, the bandwidth suitable for communication is a bandwidth the value of which is equal to or smaller than a utilized bandwidth that does not cause a packet transmission time delay. However, even a certain value larger than the utilized bandwidth may be set as the bandwidth suitable for communication if the packet transmission time delay caused by the utilized bandwidth is allowable.

In the embodiment described above, the receiving communication apparatus measures bandwidths and notifies the transmitting communication apparatus of only the measurement results. However, it is also possible for the transmitting communication apparatus, another server, and the like to measure bandwidths. When the transmitting communication apparatus measures bandwidths, for example, the receiving communication apparatus may calculate reception intervals and transmission intervals. In this case, the receiving communication apparatus notifies the receiving communication apparatus of the calculated reception intervals and transmission intervals. The transmitting communication apparatus uses the reception intervals and transmission intervals received from the receiving communication apparatus to detect a point in time at which the difference of (reception interval-transmission interval) changes. Then, the transmitting communication apparatus can measure the bandwidth. However, the amount of data to be transmitted and received between the receiving communication apparatus and the transmitting communication apparatus is increased as compared with the case in which the receiving communication apparatus notifies the transmitting communication apparatus only the measurement results.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication apparatus comprising:
a processor; and
a memory configured to store computer-readable instructions that, when executed, instruct the communication apparatus to execute steps-processes comprising:
acquiring a type of transmission data referring to information about the transmission data, wherein the transmission data is data to be packetized and transmitted;
limiting a search range of a network bandwidth, based on information about a utilized bandwidth associated with each acquired type of the transmission data, wherein the network bandwidth is measured by a transmission interval of a transmission of a plurality of packets via a network, and a reception interval of a reception of the plurality of packets via the network;
setting the search range according to the limited search range; and
transmitting a plurality of packets within the limited search range for measuring the network bandwidth,
wherein limiting the search range comprises:
acquiring an average utilized bandwidth for each acquired type of the transmission data, wherein the average utilized bandwidth is an average of the utilized bandwidths that have been used to transmit the transmission data of each of the acquired type of the transmission data;
determining, as a first sum, a sum of the acquired average utilized bandwidth for each acquired type of the transmission data;
acquiring a dispersion of the utilized bandwidths for each acquired type of the transmission data;
determining, as a second sum, a sum of the acquired dispersion of the utilized bandwidths for each acquired type of the transmission data;
determining, as a criterion value, a sum of the first sum and a standard deviation based on the second sum, or a sum of the first sum and a value obtained by multiplying the second sum by N (N>0); and
setting the criterion value to an upper limit of a center value of the search range, or to an upper limit of a maximum value of the search range.

2. The communication apparatus according to claim 1, wherein limiting the search range comprises:
acquiring a maximum network bandwidth for each acquired type of the transmission data, wherein the maximum network bandwidth is an upper limit of the utilized bandwidth configured to be used to transmit the transmission data of each acquired type of the transmission data;
determining a maximum utilized bandwidth by determining a sum of the acquired maximum network bandwidths of the acquired types of the transmission data; and
setting the determined maximum utilized bandwidth to an upper limit of a center value of the search range, or to an upper limit of a maximum value of the search range.

3. The communication apparatus according to claim 2, wherein the computer-readable instructions instruct the communication apparatus to execute processes further comprising:
acquiring a latest measurement value of the network bandwidth measured by transmitting a plurality of packets;
determining whether the latest measurement value of the network bandwidth is larger than the upper limit; and
setting the upper limit to the center value of the search range, in response to determining that the latest measurement value of the network bandwidth is larger than the upper limit.

4. The communication apparatus according to claim 2, wherein the computer-readable instructions instruct the communication apparatus to execute processes further comprising:
determining whether the type of the transmission data is changed; and
setting the upper limit in response to determining that the type of the transmission data is changed.

5. The communication apparatus according to claim 1, wherein the computer-readable instructions instruct the communication apparatus to execute processes further comprising:
setting the transmission interval, a number of the plurality of packets and a packet size, wherein the packet size represents a size of each of the plurality of packets;

generating a plurality of packets according to the number of the plurality of the packets from the transmission data based on the packet size, wherein each of the plurality of the packets includes time information which identifies the set transmission interval; and transmitting the plurality of the packets based on the set transmission interval.

6. A method for implementing communication at a communication apparatus, the method comprising:

acquiring a type of transmission data, referring to information about the transmission data, wherein the transmission data is data to be packetized and transmitted;

limiting a search range of a network bandwidth based on information about a utilized bandwidth associated with each acquired type of the transmission data, wherein the network bandwidth is measured by a transmission interval of a transmission of a plurality of packets via a network, and a reception interval of a reception of the plurality of packets via the network;

setting the search range according to the limited search range; and transmitting a plurality of packets within the limited search range for measuring the network bandwidth, wherein limiting the search range comprises:

acquiring an average utilized bandwidth for each acquired type of the transmission data, wherein the average utilized bandwidth is an average of the utilized bandwidths that have been used to transmit the transmission data of each of the acquired type of the transmission data;

determining, as a first sum, a sum of the acquired average utilized bandwidth for each acquired type of the transmission data;

acquiring a dispersion of the utilized bandwidths for each acquired type of the transmission data;

determining, as a second sum, a sum of the acquired dispersion of the utilized bandwidths for each acquired type of the transmission data;

determining, as a criterion value, a sum of the first sum and a standard deviation based on the second sum, or a sum of the first sum and a value obtained by multiplying the second sum by N (N>0); and setting the criterion value to an upper limit of a center value of the search range, or to an upper limit of a maximum value of the search range.

7. The method according to claim 6, wherein limiting the search range comprises:

acquiring a maximum network bandwidth for each acquired type of the transmission data, wherein the maximum network bandwidth is an upper limit of the utilized bandwidth configured to be used to transmit the transmission data of each acquired type of the transmission data;

determining a maximum utilized bandwidth by determining a sum of the acquired maximum network bandwidths of the acquired types of the transmission data; and setting the determined maximum utilized bandwidth to an upper limit of a center value of the search range, or to an upper limit of a maximum value of the search range.

8. The method according to claim 7, further comprising:

acquiring a latest measurement value of the network bandwidth measured by transmitting a plurality of packets;

determining whether the latest measurement value of the network bandwidth is larger than the upper limit; and setting the upper limit to the center value of the search range, in response to determining that the latest measurement value of the network bandwidth is larger than the upper limit.

9. The method according to claim 7, further comprising:

determining whether the type of the transmission data is changed; and setting the upper limit in response to determining that the type of the transmission data is changed.

10. The method according to claim 6, further comprising:

setting the transmission interval, a number of the plurality of packets and a packet size, wherein the packet size represents a size of each of the plurality of packets;

generating a plurality of packets according to the number of the plurality of the packets from the transmission data based on the packet size, wherein each of the plurality of the packets includes time information which identifies the set transmission interval; and transmitting the plurality of the packets based on the set transmission interval.

11. A non-transitory computer-readable medium storing computer-readable instructions that, when executed, cause a communication apparatus to execute processes comprising:

acquiring a type of transmission data, referring to information about the transmission data, wherein the transmission data is data to be packetized and transmitted;

limiting a search range of a network bandwidth based on information about a utilized bandwidth associated with each acquired type of the transmission data, wherein the network bandwidth is measured by a transmission interval of a transmission of a plurality of packets via a network, and a reception interval of a reception of the plurality of packets via the network;

setting the search range according to the limited search range; and transmitting a plurality of packets within the limited search range for measuring the network bandwidth, wherein limiting the search range comprises:

acquiring an average utilized bandwidth for each acquired type of the transmission data, wherein the average utilized bandwidth is an average of the utilized bandwidths that have been used to transmit the transmission data of each of the acquired type of the transmission data;

determining, as a first sum, a sum of the acquired average utilized bandwidth for each acquired type of the transmission data;

acquiring a dispersion of the utilized bandwidths for each acquired type of the transmission data;

determining, as a second sum, a sum of the acquired dispersion of the utilized bandwidths for each acquired type of the transmission data;

determining, as a criterion value, a sum of the first sum and a standard deviation based on the second sum, or a sum of the first sum and a value obtained by multiplying the second sum by N (N>0); and setting the criterion value to an upper limit of a center value of the search range, or to an upper limit of a maximum value of the search range.

12. The non-transitory, computer-readable medium according to claim 11, wherein limiting the search range comprises:

acquiring a maximum network bandwidth for each acquired type of the transmission data, wherein the maximum network bandwidth is an upper limit of the utilized bandwidth configured to be used to transmit the transmission data of each acquired type of the transmission data;

determining a maximum utilized bandwidth by determining a sum of the acquired maximum network bandwidths of the acquired types of the transmission data; and setting the determined maximum utilized bandwidth to an upper limit of a center value of the search range, or to an upper limit of a maximum value of the search range.

13. The non-transitory, computer-readable medium according to claim 12, wherein the computer-readable instructions instruct the communication apparatus to execute processes further comprising:

acquiring a latest measurement value of the network bandwidth by transmitting a plurality of packets;

determining whether the latest measurement value of the network bandwidth is larger than the upper limit; and setting the upper limit to the center value of the search range, in response to determining that the latest measurement value of the network bandwidth is larger than the upper limit.

14. The non-transitory, computer-readable medium according to claim 12, wherein the computer-readable instructions instruct the communication apparatus to execute processes further comprising:

determining whether the type of the transmission data is changed; and setting the upper limit in response to determining that the type of the transmission data is changed.

15. The non-transitory, computer-readable medium according to claim 11, wherein the computer-readable instructions instruct the communication apparatus to execute processes further comprising:

setting the transmission interval, a number of the plurality of packets and a packet size, wherein the packet size represents a size of each of the plurality of packets;

generating a plurality of packets according to the number of the plurality of the packets from the transmission data based on the packet size, wherein each of the plurality of the packets includes time information which identifies the set transmission interval; and transmitting the plurality of the packets based on the set transmission interval.

* * * * *